United States Patent [19]
Yamada et al.

[11] Patent Number: 6,163,735
[45] Date of Patent: Dec. 19, 2000

[54] NUMERICALLY CONTROLLED MACHINE TOOL

[75] Inventors: Shigeru Yamada; Takashi Saito, both of Takaoka, Japan

[73] Assignee: Kitamura Machinery Co., Ltd., Toyama-Ken, Japan

[21] Appl. No.: 08/945,389

[22] PCT Filed: Feb. 27, 1996

[86] PCT No.: PCT/JP96/00446

§ 371 Date: Feb. 9, 1998

§ 102(e) Date: Feb. 9, 1998

[87] PCT Pub. No.: WO97/31750

PCT Pub. Date: Sep. 4, 1997

[51] Int. Cl.[7] .................................................. G05B 19/404
[52] U.S. Cl. .......................... 700/193; 700/176; 318/571
[58] Field of Search .................................... 700/193, 188, 700/187, 186, 179, 176, 170, 60, 38, 39, 78; 318/570, 571, 574, 568.22, 630, 632

[56] References Cited

U.S. PATENT DOCUMENTS 5,153,440  10/1992  Ueta et al. ............................. 318/571

FOREIGN PATENT DOCUMENTS 3-166604  7/1991  Japan .
4-4405    1/1992  Japan .

*Primary Examiner*—William Grant
*Assistant Examiner*—Steven R. Garland
*Attorney, Agent, or Firm*—Ronald P. Kananen; Rader, Fishman & Grauer

[57] ABSTRACT

It is the object of the invention to correct a quadrantal protuberance depending on machining conditions, to improve a machining efficiency, and to improve the accuracy of a machining operation. A numerically controlled machine tool is provided with quadrantal protuberance correction storage means (301*a* and 301*b*) that stores a plurality of sets of the amount of quadrantal protuberance correction.

18 Claims, 9 Drawing Sheets

NUMERICALLY CONTROLLED MACHINE TOOL

TECHNICAL FIELD

The present invention relates to a numerically controlled machine tool for correcting a quadrantal protuberance.

BACKGROUND OF THE INVENTION

In the case where a circular machining or circular-arc machining operation is carried out by an end mill in a numerically controlled machine tool, slight backlashes of a mechanical system, delays in a follow-up operation, errors by the characteristics of a servo motor, or the like arise every time a workpiece is shifted a quadrant as defined between 0 degree, 90 degrees, 180 degrees and 270 degrees. With the result that, there becomes a problem that a quadrantal protuberance such as a protuberance and undercut occurs on the machined surface.

To correct such a quadrantal protuberance, a conventional NC apparatus has a function of correcting a quadrantal protuberance. For the correction for a quadrantal protuberance, a plurality of feeding operations are corrected on the basis of the amount of quadrantal protuberance correction, whereby the quadrantal protuberance is corrected.

However, the amount of a protuberance, i.e., the size of a quadrantal protuberance varies with machine tools. For this reason, the amount of a quadrantal protuberance correction is input to an NC apparatus in the form of a parameter according to the machine tools.

Where a perfectly-circular machining operation is carried out at high speed, for example, where a perfectly-circular machining operation is carried out at a feed rate of 10 m/min., a diameter of a resultantly finished workpiece becomes smaller than a programmed diameter, which results in a low degree of accuracy. This is attributable to the fact that errors arise in a feed mechanism according to a programmed geometry and feed rate.

To correct these errors, a conventional NC apparatus is so arranged as to be able to utilize a geometrical error correction function.

In general, this geometrical error correction function is optionally available and can be used simultaneously when correcting a quadrantal protuberance.

A quadrantal protuberance arises unless a quadrantal protuberance correction is carried out regardless of using the geometrical error correction function. However, the amount of a quadrantal protuberance differs according to whether or not the geometrical error correction function is used. Therefore, it is desirable to control the amount of quadrantal protuberance correction according to the amount of a quadrantal protuberance in each case.

However, a conventional NC apparatus is capable of storing only one set of the amount of a quadrantal protuberance, and hence it is not easy to control the amount of quadrantal protuberance correction according to the amount of the quadrantal protuberances, which in turn makes it impossible to automate the adjustment of the extent of quadrantal protuberance correction. For these reasons, the efficiency of machining operations is apt to become reduced.

In the current state of the art, the mean value between the amount of quadrantal protuberance correction where the geometrical error correction function is used and the amount of quadrantal protuberance correction where the geometrical error correction function is not used is input instead of adjusting the amount of quadrantal protuberance correction. Because of this, it is impossible to appropriately correct a quadrantal protuberance depending on the presence of geometrical errors to be corrected, which in turn makes it impossible to improve the accuracy of a machining operation.

SUMMARY OF THE INVENTION

The object of the present invention is to provide a numerically controlled machine tool being capable of improving the efficiency and accuracy of machining operations, as well as being capable of correcting a quadrantal protuberance depending on machining conditions such as the presence of geometrical error correction.

To solve the previously described drawbacks in the art, according to a first aspect of the present invention, there is provided a numerically controlled machine tool having quadrantal protuberance correction storage means for storing a plurality of sets of the amount of quadrantal protuberance correction.

According to a second aspect of the present invention, there is provided a numerically controlled machine tool which has a geometrical error correction function and quadrantal protuberance correction storage means for storing two sets of the amount of quadrantal protuberance correction depending on the presence of geometrical errors to be corrected.

DETAILED DESCRIPTION OF THE PREFERRED EMBODIMENTS

Figure 1:
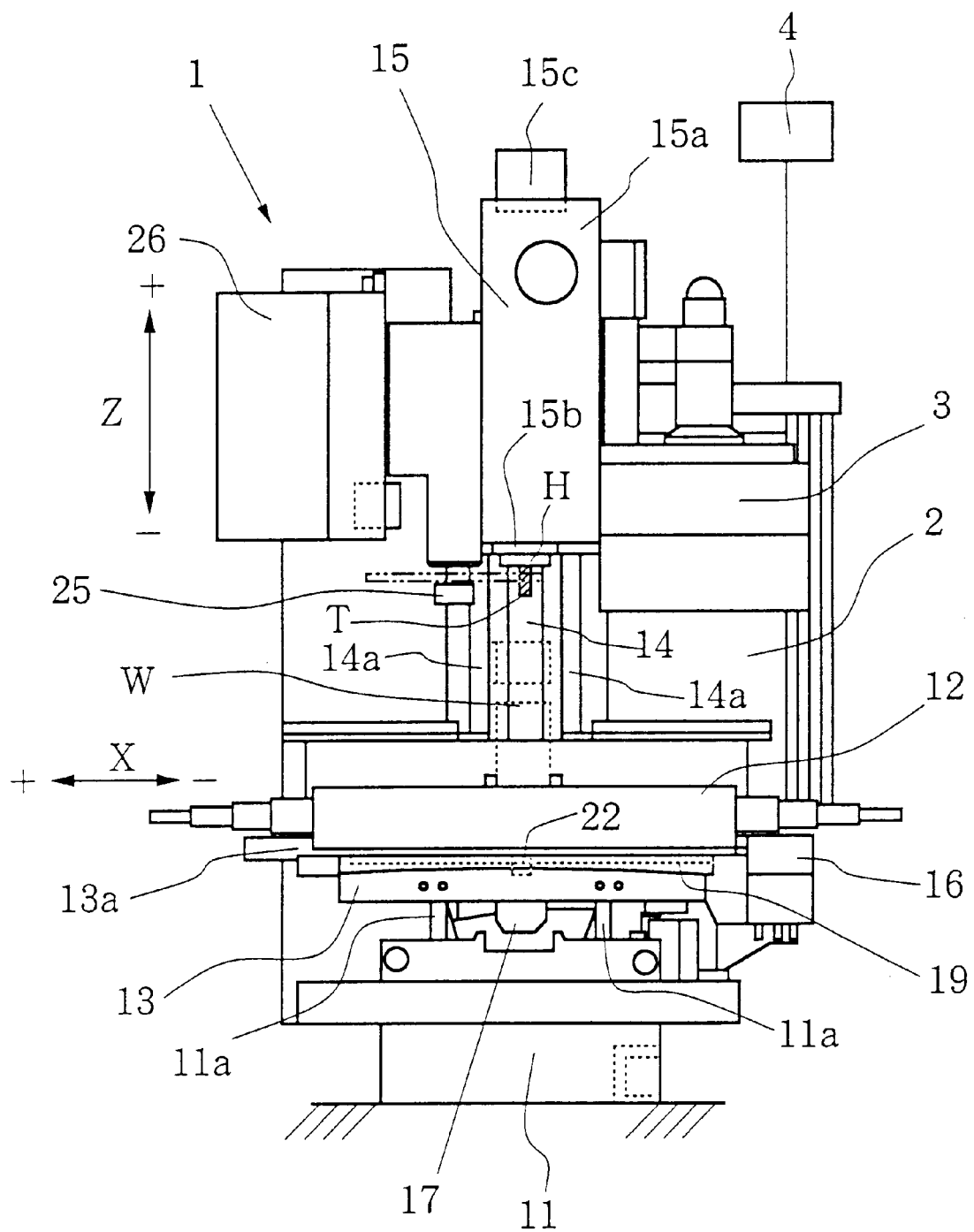
FIG. 1 is a front view of a numerically controlled machine tool according to one preferred embodiment of the present invention.

A numerically controlled machine tool according to one embodiment of the present invention will be described hereinbelow.

The numerically controlled machine tool is provided with quadrantal protuberance correction storage means for storing a plurality of sets of the amount of quadrantal protuberance correction.

With this quadrantal protuberance correction storage means, it is possible to store a plurality of sets of the amount of quadrantal protuberance correction so as to correspond to machining conditions, e.g., in the case where the extent of quadrantal protuberance varies with machining conditions.

In this case, the amount of quadrantal protuberance correction can be automatically set depending on the machining conditions, and a quadrantal protuberance can be corrected on the basis of the thus-set amount of quadrantal protuberance correction. Consequently, a machining accuracy can be improved.

The same quadrantal protuberance correction function as conventionally used can be employed for means that corrects a quadrantal protuberance on the basis of the amount of quadrantal protuberance correction.

A quadrantal protuberance is a defect, such as an indentation or a protuberance, which arises in a machined surface. Such a quadrantal protuberance arises when the feed direction of each shaft changes during the course of a contouring control operation such as a circular machining operation, a circular-arc machining operation, or a perfectly-circular machining operation. For example, where a contouring control operation is carried out by feeding the X-axis, Y-axis, and Z-axis backlashes of a mechanical system, delays in a follow-up operation, errors by the characteristics of a servo motor, or the like arise when the feed direction of the shaft in each direction changes. Further, lags arise in the timing at which the X-axis, Y-axis, and Z-axis are fed, which in turn brings about a quadrantal protuberance.

The amount of a quadrantal protuberance varies with machine tools, and it may also differ depending on machining conditions.

The machining conditions include for example the presence of geometrical error correction, feed rate and others.

Next, a numerically controlled machine tool according to another embodiment of the present invention will be described.

The numerically controlled machine tool of the present embodiment that has a geometrical error correction function is provided with quadrantal protuberance correction means for storing two sets of the amount of quadrantal protuberance correction so as to correspond to the presence of geometrical error correction.

With this arrangement, the amount of quadrantal protuberance correction can be automatically set depending on the presence of geometrical error correction, and a quadrantal protuberance can be corrected on the basis of the amount of quadrantal protuberance correction.

The geometrical error correction function is the same as has been conventionally used. If there is any geometrical error correction, geometrical errors will be corrected. In contrast, if there is not any geometrical error correction, a geometrical error correction operation will not be carried out.

The geometrical errors are errors in the shape of a workpiece surface other than a quadrantal protuberance, such as for example, dimensional errors. The degree of geometrical errors arises depending on the programmed geometry and feed rate.

With reference to FIGS. 1 to 7, an illustrative numerically controlled machine tool of the present invention will be described.

The numerically controlled machine tool is a vertical type machining center which comprises a machine tool main body 1, a numerical controller 2, a control panel 3, and a data file on-line system 4.

A. MACHINE TOOL MAIN BODY

Figure 2:
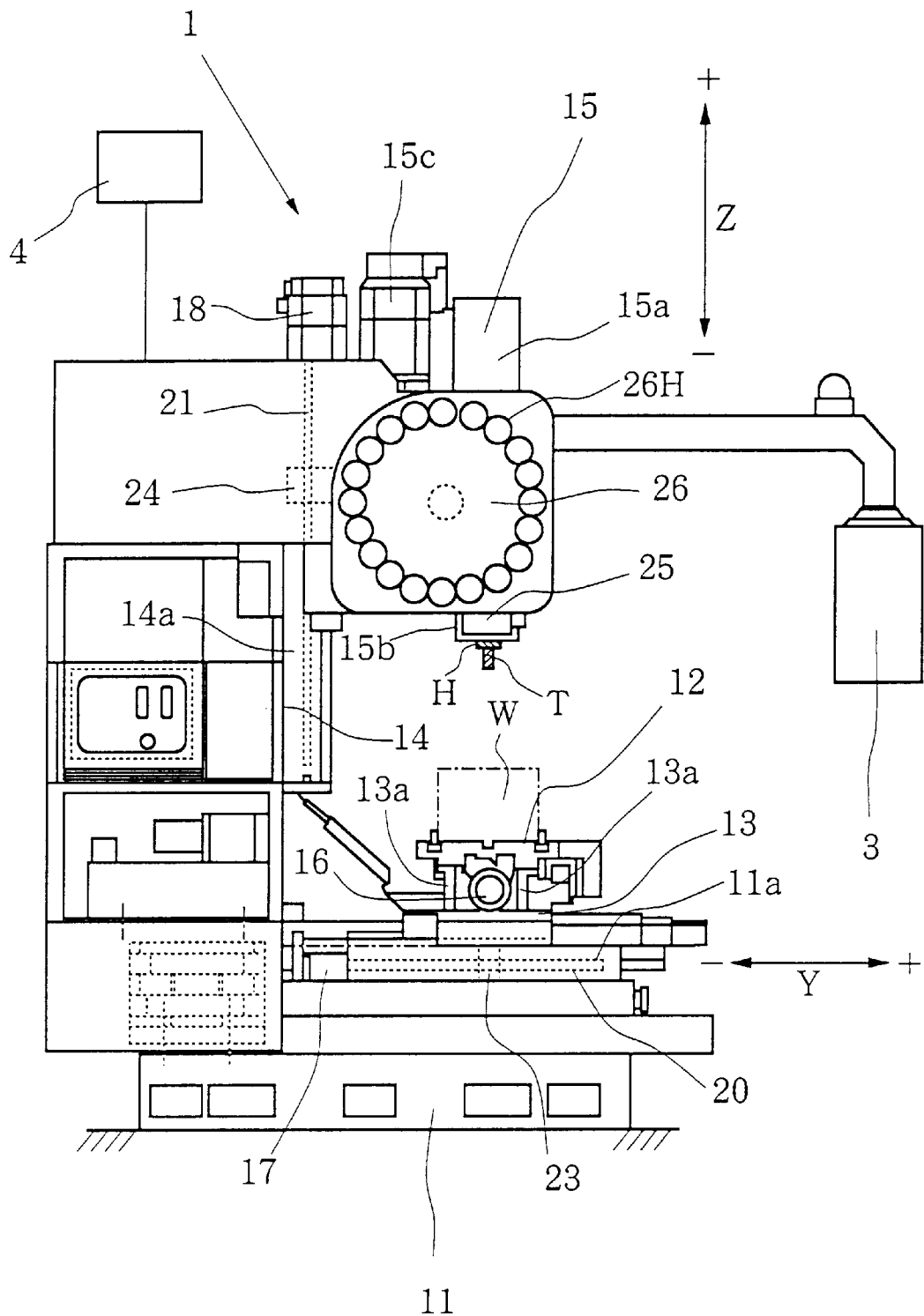
FIG. 2 is a side view of the numerically controlled machine tool shown in FIG. 1.

With reference to FIGS. 1 and 2, the machine tool main body 1 will now be described.

The machine tool main body 1 comprises a bed 11, a first table 12, a second table 13, a column 14, a main spindle head 15, first to third servo motors 16 to 18, first to third feed screws 19 to 21, first to third nuts 22 to 24, an automatic tool changer 25, a tool magazine 26, and first to third rails 13a, 11a, and 14a.

The first servo motor 16 and the first rail 13a are fixed to the second table 13, respectively. The first table 12 is so disposed as to be able to travel along the first rail 13a in the direction of the X axis. The X axis is a horizontal axis that extends in a lateral direction of the machine tool.

The first feed screw 19 is fixed to a drive shaft of the first servo motor 16 and is rotated by this first servo motor 16. The first nut 22 is secured to the first table 12 and is in mesh with the first feed screw 19. The first feed screw 19 and the first nut 22 are a ball screw and a ball nut, respectively. The first table 12 and the first nut 22 move in the (plus) and (minus) directions along the X-axis with respect to the second table 13 by means of forward and reverse rotations of the first feed screw 19.

Figure 4:
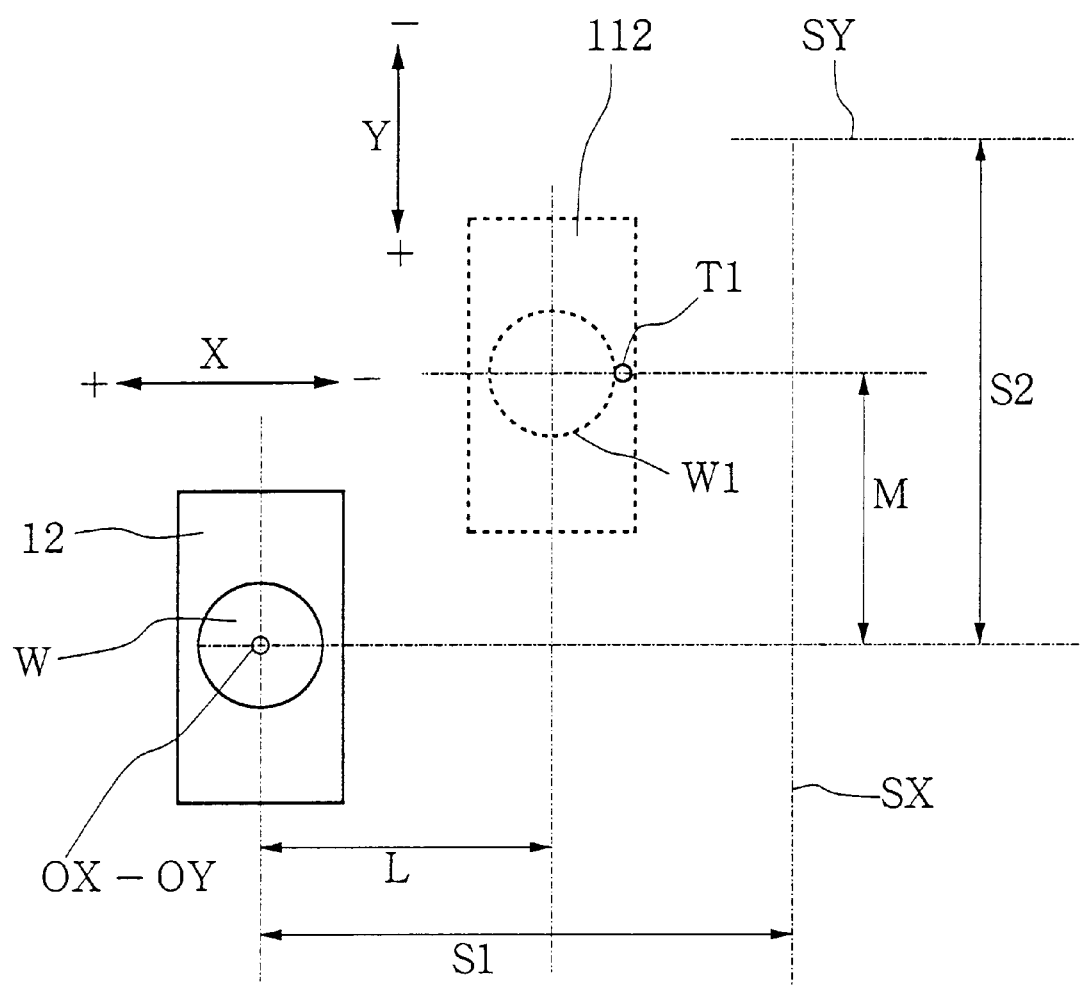
FIG. 4 is a schematic representation of feeding actions in the X-axis and Y-axis directions.
Figure 5:
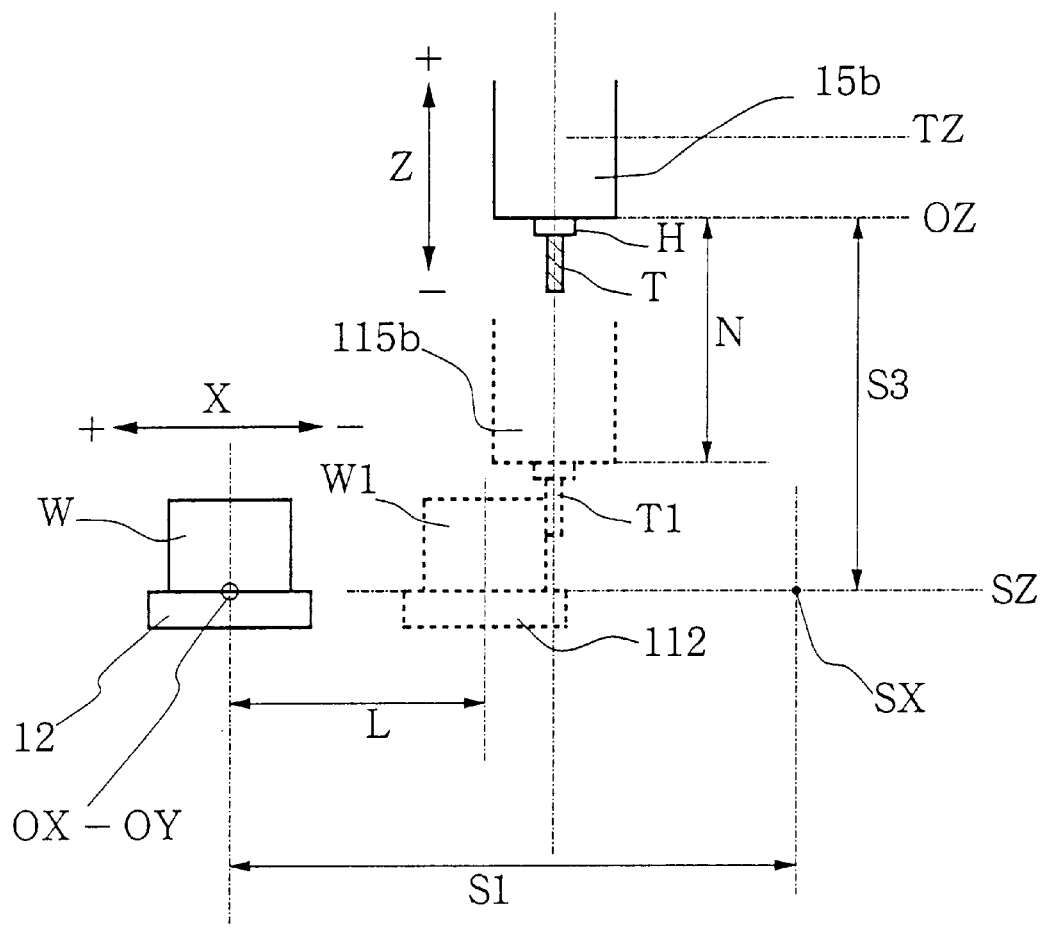
FIG. 5 is a schematic representation of feeding actions in the X-axis and Z-axis directions.

As can be seen from FIGS. 4 and 5, the first table 12 is capable of traveling over a stroke S1 from the X axis mechanical origin OX to the X axis end point SX along the X axis.

The second servo motor 17 and the second rail 11a are fixed to the bed 11, respectively. The second table 13 is so disposed as to be able to travel along the second rail 11a in the direction of the Y axis. The Y axis is a horizontal axis that intersects the X axis at right angles and extends in a longitudinal direction of the machine tool.

The second feed screw 20 is secured to a drive shaft of the second servo motor 17 and is rotated by this second servo motor 17. The second nut 23 is secured to the second table 13 and is in mesh with the second feed screw 20. The second feed screw 20 and the second nut 23 are a ball screw and a ball nut, respectively. The second table 13 and the second nut 23 move in the (plus) and (minus) directions along the Y axis with respect to the bed 11 by means of forward and reverse rotations of the second feed screw 20.

As can be seen from FIG. 4, the second table 13 is capable of traveling over a stroke S2 from the mechanical origin OY to the end point SY along the Y axis.

The third servo motor 18 and the third rail 14a are fixed to the column 14, respectively. The column 14 is fixed to the bed 11. The main spindle head 15 is so disposed as to be able to travel along the third rail 14a in the direction of the Z axis. The Z axis is a vertical axis that intersects the X and Y axes at right angles.

The third feed screw 21 is secured to a drive shaft of the third servo motor 18 and is rotated by this third servo motor 18. The third nut 24 is fixed to the main spindle head 15 and is in mesh with the third feed screw 21. The third feed screw 21 and the third nut 24 are a ball screw and a ball nut, respectively. The main spindle head 15 and the third nut 24 travel in the (plus) and (minus) directions along the Z axis with respect to the column 14 by the forward and reverse rotations of the third feed screw 21.

As shown in FIG. 5, the main spindle head 15 is capable of traveling over a stroke S3 from the Z axis mechanical origin OZ to the Z axis end point SZ along the Z axis. The main spindle head 15 is capable of further rising to a Z-axis tool change position ZT at the time of change of a tool holder H which will be described later.

In such a numerically controlled machine tool, the X, Y, and Z axes are positioning axes, respectively.

A workpiece W is detachably loaded on the first table 12.

The main spindle head 15 comprises a main spindle head main body 15a, a main spindle 15b, and an electric motor 15c for use in driving the main spindle.

The main spindle 15b is rotatably attached to the main spindle head main body 15a. The electric motor 15c for use in the main spindle is placed on the main spindle head main body 15a so as to rotate the main spindle 15b. The tool holder H is detachably attached to the main spindle 15b, and this tool holder H retains an end mill T.

The automatic tool changer 25 and the tool magazine 26 are secured to the column 14. A plurality of tool holders 26H are set in the tool magazine 26. Each tool holder 26H retains a tool. A conventional tool such as a cutting tool, a turning tool, or a grinding tool may be used as the tool.

An arbitrary tool holder 26H of the tool magazine 26 and the tool holder H of the main spindle 15b can be changed for each other by virtue of the automatic tool changer 25.

B. NUMERICAL CONTROLLER 2

Figure 3:
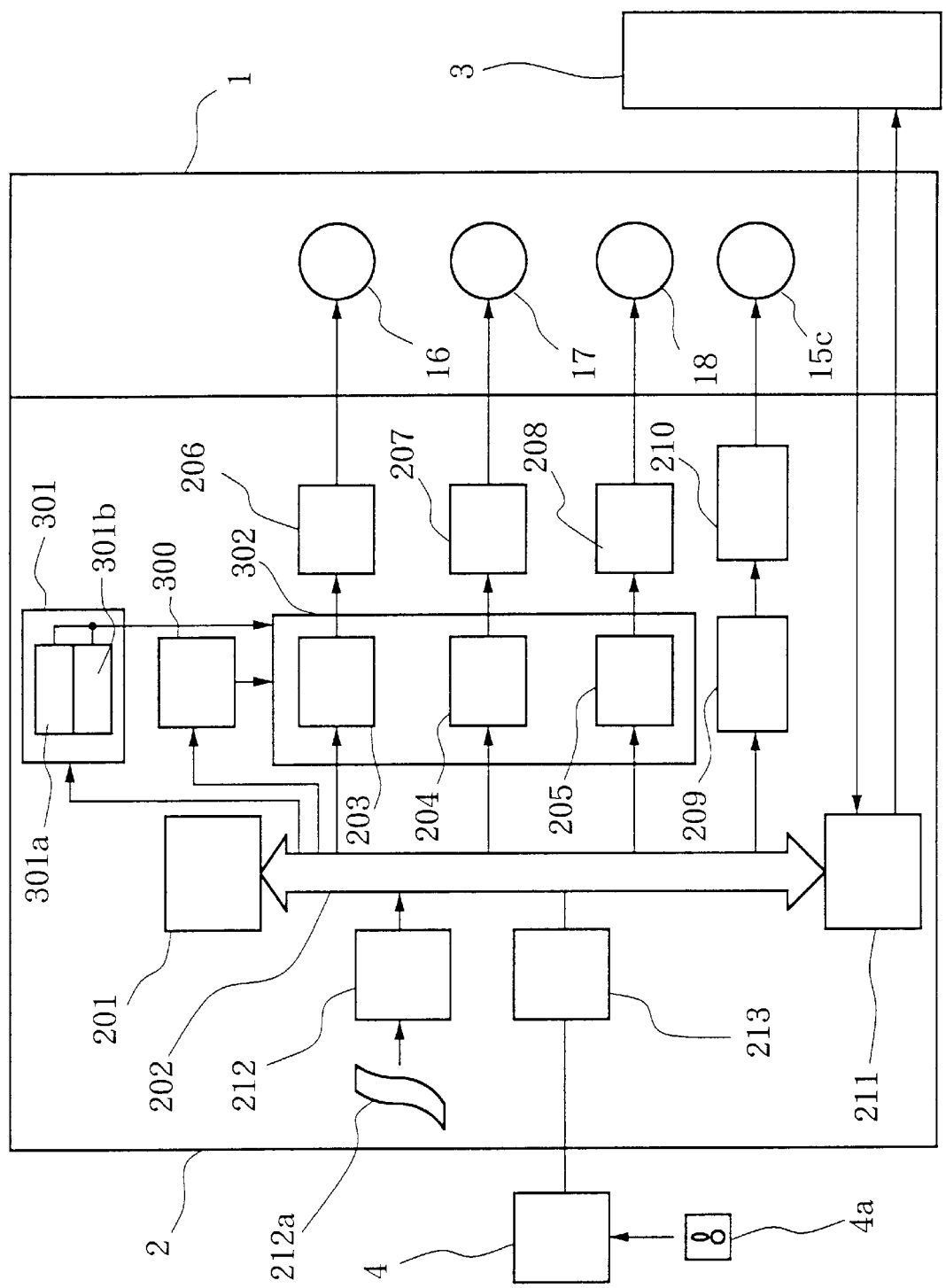
FIG. 3 is a schematic diagram that shows electrical connections of the numerically controlled machine tool shown in FIG. 1.

With reference to FIG. 3, the numerical controller 2 will be described. FIG. 3 schematically shows electrical connections of the numerically controlled machine tool.

The numerical controller 2 has geometrical error correction and quadrantal protuberance correction functions which will be described later.

The numerical controller 2 comprises a central processing unit 201, an address/data bus 202, first to third servo amplifiers 206–208, an interface 209, a sequence control section 210, a first input/output device 211, a tape reader 212, a second input/output device 213, geometrical error correction setting means 300, quadrantal protuberance correction setting means 301, and contouring control correction means 302. The contouring control correction means 302 is provided with first to third command signal correction means 203 to 205.

The central processing unit 201 and the first input/output device 211 are electrically connected to the interface 209, the tape reader 212, the second input/output device 213, the geometrical error correction setting means 300, the quadrantal protuberance correction setting means 301, and the first to third command signal correction means 203 to 205, via the address/data bus 202, respectively. The contouring control correction means 302 is electrically connected to the geometrical error correction setting means 300 and the quadrantal protuberance correction setting means 301. Various signals and program data can be transmitted and received through these electrical connections.

The geometrical error correction setting means 300 stores the amount of geometrical error correction.

The quadrantal protuberance correction setting means 301 is provided with two protuberance correction storage means 301a and 301b. These quadrantal protuberance correction storage means 301a and 301b store the amount of first and second quadrantal protuberance correction, respectively.

The amount of the first quadrantal protuberance correction corresponds to the amount of a quadrantal protuberance in the case where there is any geometrical error correcttion, while the amount of the second quadrantal protuberance correction corresponds to the amount of a quadrantal protuberance in the case where there is not any geometrical error correcttion. The amount of the first and second quadrantal protuberance correction can be entered as parameters from the control panel 3.

The first to third servo amplifiers 206 to 208 are connected to the first to third command signal correction means 203 to 205, respectively. The first to third servo motors 16 to 18 are connected to the first to third servo amplifiers 206 to 208, respectively.

The program data can be stored in the central processing unit 201 as is conventionally done. For example, program data are read from a floppy disk 4a by means of a data file on-line system 4 which will be described later, and the thus-read program data are stored in a memory of the central processing unit 201. Alternatively, the program data are manually entered from the control panel 3, and the thus-entered program data are stored in the memory of the central processing unit 201.

On the basis of the program data, the central processing unit 201 transmits the X-axis, Y-axis, and Z-axis servo command signals to the first to third command signal correction means 203 to 205, respectively so as to control the sequence control section 210, the geometrical error correction setting means 300 and the quadrantal protuberance correction setting means 301. The servo command signal comprises a speed instruction signal, a travel distance instruction signal, and a travel direction command signal.

The first to third instruction signal correction means 203 to 205 correct the X-axis, Y-axis, and Z-axis servo command signals, as will be described later. The thus-corrected X-axis, Y-axis, and Z-axis servo command signals are transmitted to the first to third servo amplifiers 206 to 208, respectively.

The first to third servo amplifiers 206 to 208 control the first to third servo motors 16 to 18 on the basis of the corrected X-axis, Y-axis, and Z-axis servo command signals. As a result, the feeding is performed in the directions of the X, Y, and Z axes. The feed rate in each axial direction is based on the speed command signal; the direction of the feeding action is based on the travel direction command; and the travel distance is based on the travel distance command signal.

The sequence control section 210 is connected to the interface 209. The electric motor 15c for use in driving the main spindle is connected to the sequence control section 210.

The sequence control section 210 controls the electric motor 15c for use in driving the main spindle, whereby the main spindle 15b and the tool T are rotated.

C. CONTROL PANEL 3

The control panel 3 is connected to the first input/output device 211.

D. DATA FILE ON-LINE SYSTEM 4

The data file on-line system 4 will now be described.

The data file on-line system 4 is electrically connected to the second input/output device 213 and reads program data from a floppy disk 4a.

E. GEOMETRICAL ERROR CORRECTION FUNCTION AND QUADRANTAL PROTUBERANCE CORRECTION FUNCTION

Next, the geometrical error correction and quadrantal protuberance correction functions will be described.

Information about the presence of geometrical error correction is input from the control panel 3 and is transmitted to the geometrical error correction setting means 300 and the quadrantal protuberance correction setting means 301, respectively.

Where there is any geometrical error correction, the geometrical error correction setting means 300 sends the amount of geometrical error correction to the contouring control correction means 302. Conversely, where there is not any geometrical error correction, the amount of geometrical error correction is not sent.

Where there is any geometrical error correction, the quadrantal protuberance correction setting means 301 sends the amount of first quadrantal protuberance correction to the contouring control correction means 302. Conversely, where there is not any geometrical error correction, the amount of second quadrantal protuberance correction is sent to the contouring control correction means 302.

The first to third command signal correction means 203 to 205 are controlled by the contouring control correction means 302. Where there is any geometrical errors to be corrected, the X-axis, Y-axis, and Z-axis servo command signals are corrected on the basis of the amount of geometrical error correction, respectively, and subsequently, the servo command signals are further corrected on the basis of the amount of the first quadrantal protuberance correction. As a result, geometrical errors are corrected, and a quadrantal protuberance is corrected in the case where there is any geometrical error correction. Conversely, in the case where there is not any geometrical error correction, the X-axis, Y-axis, and Z-axis servo command signals are simultaneously corrected on the basis of the amount of the second quadrantal protuberance correction. Consequently, a quadrantal protuberance is corrected in the case where there is not any geometrical error correction.

In any event, it is desirable to correct the X-axis, Y-axis, and Z-axis servo instruction signals simultaneously or in a time-divided way. Thereby, when the feeding direction of each axis is changed, it becomes possible to correct lags in the timing at which the X-axis, Y-axis, and Z-axis are fed as well as errors due to backlash of a mechanical system or the characteristics of the servo motor.

PERFECTLY-CIRCULAR MACHINING OPERATION

Figure 6:
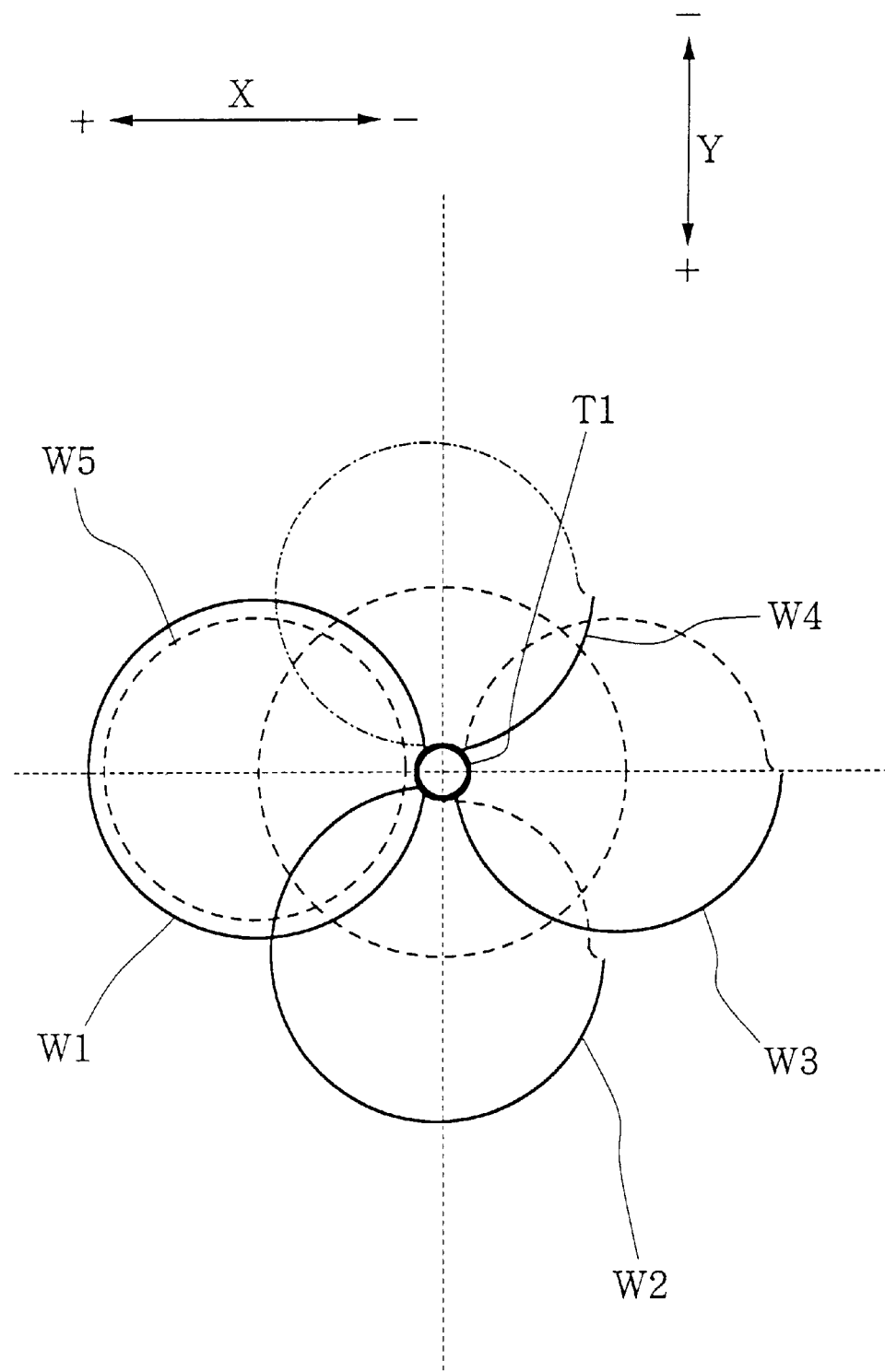
FIG. 6 is a diagrammatic representation of a perfectly-circular machining operation.

With reference to FIGS. 4 through 6, the perfectly-circular machining operation carried out by the illustrative numerically controlled machine tool will be described.

To begin with, the main spindle head 15 is positioned at the Z axis mechanical origin OZ, and the first table 12 is positioned at the X-Y axes mechanical point OX-OY. An end mill T is attached to the main spindle 15*b*, and the columnar workpiece W is mounted on the first table 12.

Figure 7:
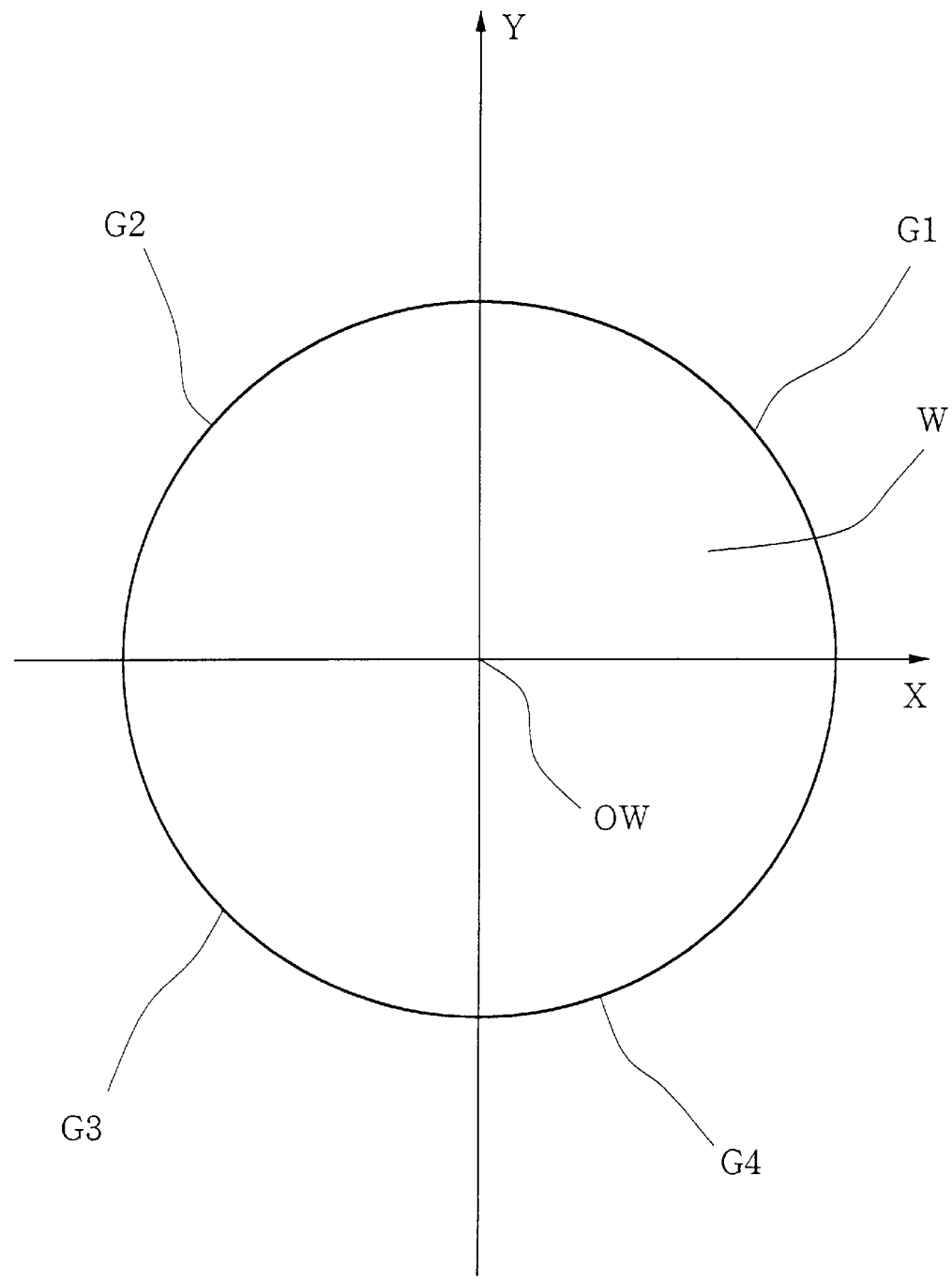
FIG. 7 is a diagrammatic representation of a workpiece coordinate system.

As shown in FIG. 7, a workpiece coordinate system is set with respect to the workpiece W. The workpiece coordinate system is a coordinate system defined by the X and Y axes, and the origin OW of that workpiece coordinate system is in line with the center axis of the workpiece W. Here, the (minus) directions of the X and Y axes are defined as being positive, while the (plus) directions of the X and Y axes are defined as being negative. To simplify the following descriptions, the workpiece W is divided into four subsections: namely, a first subsection G1 to a fourth subsection G4. The first subsection G1 to the fourth subsection G4 are positioned in a first quadrant (X>0, Y>0), a second quadrant (X<0, Y>0), a third quadrant (X<0, Y<0), and a fourth quadrant (X>0, Y<0) of the workpiece coordinate system, respectively.

With this arrangement, the main spindle head 15 is caused to travel over only a distance N from the Z-axis mechanical origin OZ in the (minus) direction of the Z axis, and it is then positioned in a first predetermined location 15*b*. The location of the end mill T in this condition is designated by reference symbol T1.

Subsequently, the second table 13 is caused to travel over only a distance M in the (minus) direction of the Y axis, and the first table 12 is caused to travel over only a distance L in the (minus) direction of the X axis. As a result, the first table 12 is caused to travel to a second predetermined location 112. Then, the boundary between the first subsection G1 and the fourth subsection G4 is cut by the end mill T. The workpiece W at this point in time (this point in time will be hereinafter referred to as a first point in time) is designated by reference symbol W1.

The first table 12 and the second table 13 are moved in the directions of the X and Y axes so that the workpiece W can make a round in a counterclockwise direction along a predetermined circumference C. During the course of movement of the workpiece, the workpiece W when it has rotated a one-quarter of a turn (this point in time will be hereinafter referred to as a second point in time) is designated by reference symbol W2. The workpiece W when it has rotated a one-half turn (this point in time will be hereinafter referred to as a third point in time) is designated by reference symbol W3. The workpiece W when it has rotated three-quarters of a turn (this point in time will be hereinafter referred to as a fourth point in time) is designated by reference symbol W4. The workpiece W when it has rotated one turn (this point in time will be hereinafter referred to as a fifth point in time) is designated by reference symbol W5. The center of the predetermined circumference C is in line with the center axis of the end mill T.

The feeding direction of either the X or Y axis changes at each of the first to fifth points in time. For example, the X-axis feed screw is fed in the (minus) direction before and after the second point in time, and there are no changes in the feeding direction. However, at the same point in time, the feeding direction of the Y-axis changes from the (minus) direction to the (plus) direction.

As a result of such movement of the workpiece W, the circumferential surfaces of the first to fourth subsections G1 to G4 are sequentially machined so that the workpiece W will assume a perfectly circular shape. The portions of the workpiece W that have finished undergoing a machining operation at each of the second to fifth points in time are designated by a broken line.

The workpiece is machined at zero degree, 90 degrees, 180 degrees, and 270 degrees of the workpiece coordinate system at the first to fourth points in time. The quadrant changes before and after each point in time.

If there is any geometrical error correction, the X-axis and Y-axis servo command signals are corrected on the basis of the amount of geometrical error correction while the workpiece W makes a round. As a result, the geometrical errors are corrected. The X-axis and Y-axis servo command signals are further corrected on the basis of the amount of the first quadrant protuberance correction before and after each of the first to fifth points in time. Consequently, a quadrant protuberance is corrected in the case where there is any geometrical error correction.

If there is not any geometrical error correction, the X-axis and Y-axis servo command signals are corrected on the basis of the amount of the second quadrant protuberance correction before and after each of the first to fifth points in time. As a result, a quadrant protuberance is corrected in the case where there is not any geometrical error correction.

By virtue of the above-described correcting operations, it is possible to minimize the quadrant protuberance caused as a result of a perfectly-circular machining operation, thereby machine the workpiece into a nearly perfect circular shape.

After the entire circumference of the workpiece W has been machined, the first table 12 is caused to travel to the X-Y axes mechanical origin OX-OY. The continuous rotation of the end mill T is suspended, and the main spindle head 15 is moved to the Z axis mechanical origin OZ.

F. EXPERIMENTAL EXAMPLE

An experimental example of the present invention will now be described.

The previously-described perfectly-circular machining operation was carried out on the condition that there was any geometrical error correction.

Figure 8:
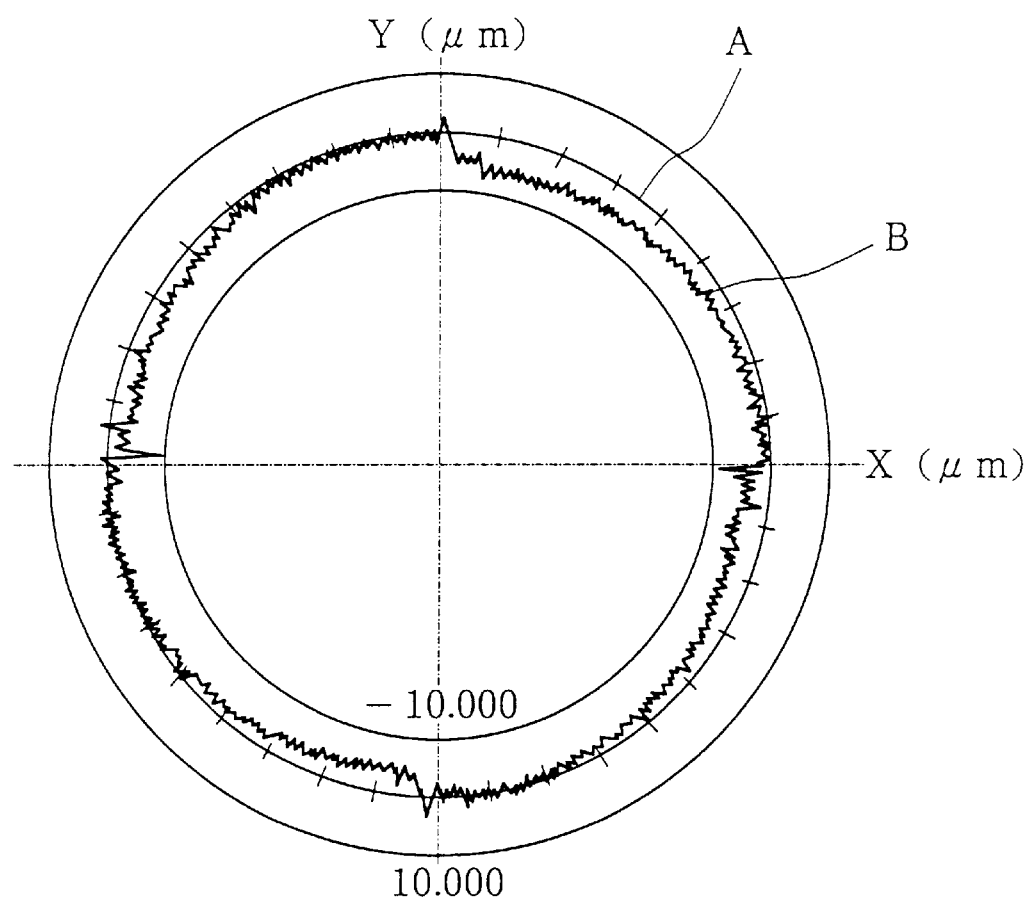
FIG. 8 is a plot of data related to the measurement of circularity of a workpiece obtained in the embodiment.

Subsequently, the shape of the machined surface of the workpiece W was measured by the use of ordinary measuring means, so that circularity measurement data were obtained. FIG. 8 shows the thus-obtained circularity measurement data. The circularity measurement data show a radial dimensional error B between the shape of the machined surface and a programmed shape (perfect circularity) A. As is evident from FIG. 8, the error B is less than 10 micrometers, and a quadrant protuberance is suppressed to a small extent.

G. COMPARATIVE EXAMPLE

Next, a comparative example will be described.

As in the previously-described illustrative experiment, the perfectly-circular machining operation was carried out on condition that there was any geometrical error correction. In lieu of the amount of the first quadrantal protuberance correction, a mean value between the amount of the first quadrantal protuberance correction and the amount of the second quadrantal protuberance correction was used. In short, the quadrantal protuberance was corrected on the basis of the same amount of quadrantal protuberance correction as used in the previously-described conventional numerically controlled machine tool.

Figure 9:
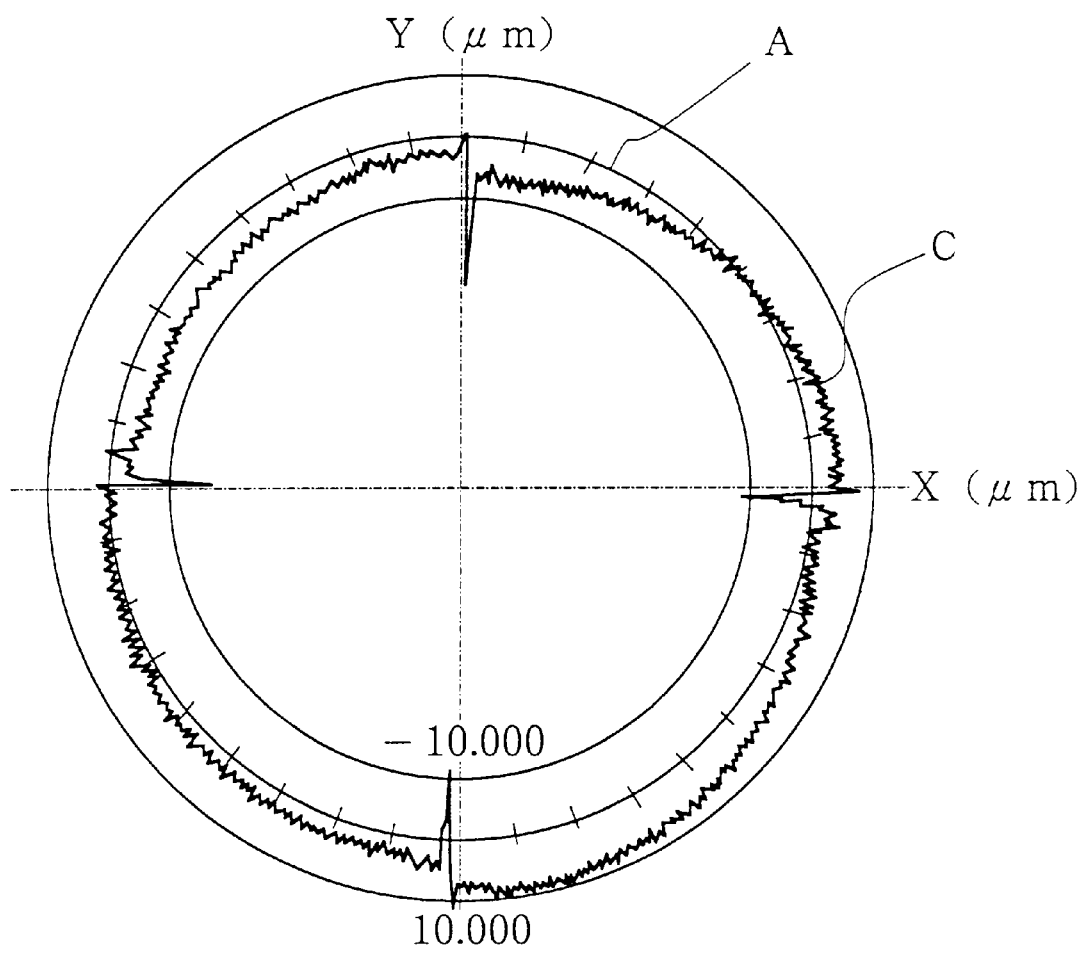
FIG. 9 is a plot of data related to the measurement of circularity of a comparative example.

FIG. 9 shows the circularity data of this comparative example. As is evident from FIG. 9, a radial dimensional error C between the shape of the machined surface and the programmed shape (perfect circularity) A was in excess of 10 micrometers; namely, a large quadrantal protuberance occurred.

H. MODIFIED EMBODIMENT

The present invention is not limited to the above-described embodiments.

For example, the present invention can be applied not only to the circular machining operation but also to other contouring control based machining operations. For example, the present invention can be applied to three-dimensional machining operations.

Further, the present invention can be applied not only to the cutting operations but also to other machining operations, e.g., grinding operations. Moreover, the present invention can be used not only in machining a columnar workpiece but also in machining workpieces having other shapes, e.g., a prismatic workpiece.

A plurality of sets of the amount of quadrantal protuberance correction can be set so as not to correspond to the presence of geometrical error correction but to correspond to a feed rate of the cutting operation or the type of a tool. In such a case, a quadrantal protuberance can be corrected in accordance with the feed rate and the type of a tool.

The present invention can be applied not only to a machine tool that controls the X, Y, and Z axes but also to a machine tool for controlling the other axes, that is, a five-axis control machine tool.

The workpiece coordinate system may not be set.

According to the first aspect of the present invention, the numerically controlled machine tool has the quadrantal protuberance correction setting means that stores a plurality of sets of the amount of protuberance correction. Therefore, if the amount of quadrantal protuberance varies with machining conditions, a plurality of sets of the amount of quadrantal protuberance correction can be stored in accordance with the machining conditions.

In this case, the amount of quadrantal protuberance correction is automatically set depending on machining conditions, and a quadrantal protuberance can be corrected on the basis of the thus-set amount of quadrantal protuberance correction. In consequence, a machining efficiency and accuracy of the machining operation can be improved.

According to the second aspect of the present invention, the numerically controlled machine tool has the quadrantal protuberance correction storage means that stores two sets of the amount of quadrantal protuberance correction in response to the presence of geometrical error correction. Therefore, the amount of quadrantal protuberance correction is automatically set in response to the presence of geometrical error correction, and a quadrantal protuberance can be corrected on the basis of the amount of quadrantal protuberance correction.

Consequently, the machining efficiency and accuracy of the machining operation can be improved.

What is claimed is:

1. A numerically controlled machine tool having a numerical controller with a quadrantal protuberance correction storage means that stores a plurality of sets of different quadrantal protuberance correction signals, wherein said numerical controller includes means to generate condition signals, said quadrantal protuberance correction storage means storing at least two of said sets of said different quadrantal protuberance correction signals, a first set of said correction signals used in combination with said condition signals and a second set of said correction signals being used in an absence of said condition signals wherein said numerical controller includes a geometrical error correction setting means which selectively generates said condition signals.

2. A numerically controlled machine tool as recited in claim 1, wherein said condition signals correspond to a machine condition.

3. A numerically controlled machine tool as recited in claim 2, wherein said machine condition comprises one of a feed rate of a cutting operation and a cutting tool.

4. A numerically controlled machine tool as recited in claim 1, wherein said numerical controller includes a contour control correction means, said contour control correction means selectively receiving said correction signals and said condition signals.

5. A numerically controlled machine tool as recited in claim 4, wherein said contour control correction means includes a plurality of command signal correction means.

6. A numerically controlled machine tool as recited in claim 5, wherein at least one of said correction signals and said condition signals activates selectively at least one of said command signal correction means.

7. A numerically controlled machine tool as recited in claim 5, wherein at least one of said correction signals and said conditional signals activates simultaneously each of said command signal correction means.

8. A numerically controlled machine tool as recited in claim 5, wherein at least one of said correction signals and said conditional signals activates only one of said command signal correction means at a time.

9. A numerically controlled machine tool as recited in claim 5, wherein each of said command signal correction means activates selectively a servo motor.

10. A numerically controlled machine tool as recited in claim 9, wherein there are three servo motors, each of said motors adapted to move a workpiece in a linear direction perpendicular to the linear direction of the other two servo motors.

11. A numerically controlled machine tool as recited in claim 9, wherein there is a single said command signal correction means for each said servo motor.

12. A numerically controlled machine tool as recited in claim 9, wherein a servo amplifier is disposed between each of said command signal correction means and said servo motor.

13. A method for correcting a quadrantal protuberance to a workpiece formed using a numerically controlled machine tool having a numerical controller comprising the steps of:

storing a plurality of sets of different quadrantal protuberance correction signals;

selectively storing condition signals, said condition signals being one of a machine condition and a geometrical error correction signal;

selecting between a first set of said correction signals to be used in combination with said condition signals and a second set of said correction signals to be used in an absence of said condition signals; and controlling a command signal correction means by means of a combination of said signals, wherein in case said numerical controller generates said condition signals, at least two of said sets of said different quadrantal protuberance correction signals are stored, and in case said numerical controller does not generate said condition signals, a first set of said correction signals used in combination with said condition signals and a second set of said correction signals are used, wherein said numerical controller includes a geometrical error correction setting means which selectively generates said condition signals.

14. A method as recited in claim 13, said command signal correction means selectively activates a servo motor adapted to move the work piece.

15. A method as recited in claim 14, wherein there are at least three of said command signal correction means, each of said signal correction means controlled independently of the other two.

16. A method as recited in claim 13, comprising the step of modifying at least one of said correction signals and said condition signals as a workpiece is machined to a final shape.

17. A numerically controlled machine tool having a quadrantal protuberance correction storage means that stores a plurality of sets of the amount of quadrantal protuberance correction so as to correspond to various operating modes of the machine tool, the numerically controlled machine tool comprising:

means (3) for inputting information concerning presence or absence of geometrical error correction wherein a signal concerning presence or absence of geometrical error correction is sent to a geometrical error correction setting means (300) and a quadrantal protuberance correction setting means (301), wherein the geometrical error correction setting means (300) sends a signal concerning the amount of geometrical error correction to a contouring control correction means (302) in case there is any geometrical error correction, and does not send a signal concerning the amount of geometrical error correction in case there is not any geometrical error correction, wherein the quadrantal protuberance correction setting means (301) sends a signal concerning the amount of first quadrantal protuberance correction to the contouring control correction means (302) in case there is any geometrical error correction, and the quadrantal protuberance correction setting means (301) sends a signal concerning the amount of second quadrantal protuberance correction to the contouring control correction means (302) in case there is not any geometrical error correction, first to third command signal correction means (203, 204, 205) controlled by the contouring control correction means (302), wherein in case there is any geometrical error correction, the first to third command signal correction means (203, 204, 205) correct X-axis servo command signals, Y-axis servo command signals and Z-axis servo command signals, respectively, on the basis of the amount of geometrical error correction, and correct them on the basis of the amount of first quadrantal protuberance correction, whereby geometrical errors are corrected, and quadrantal protuberances are corrected if there is any geometrical error correction, but if there is not any geometrical error correction, the first to third command signal correction means (203, 204, 205) correct the X-axis servo command signals, the Y-axis servo command signals and the Z-axis servo command signals, respectively, on the basis of the amount of second quadrantal protuberance correction, so that the quadrantal protuberances are corrected in case there is not any geometrical error correction.

18. A numerically controlled machine tool according to claim 17, wherein in case a work piece (W) is processed so as to have a circular shape by an end mill, if there is any geometrical error correction, then the X-axis and Y-axis servo command signals are corrected on the basis of the amount of geometrical error correction while the work piece (W) is rotated whereby the geometrical errors are corrected, wherein the X-axis and Y-axis servo command signals are further corrected on the basis of the amount of first quadrant protuberance correction before and after each of plural points in time whereby the quadrant protuberances are corrected in case there is any geometrical error correction, and wherein if there is not any geometrical error correction, then the X-axis and Y-axis servo command signals are corrected on the basis of the amount of second quadrant protuberance correction before and after each of the plural points in time, whereby the quadrant protuberances are corrected in case there is not any geometrical error correction.

* * * * *